J. HINKLEY.

Assignor to BOSTWICK & BURGESS.

CARPET SWEEPER.

No. 10,701. Reissued Mar. 23, 1886.

Witnesses.

W. C. Bancroft

G. B. Tibbitts

Inventor.

Jonas Hinkley per. Geo. H. Tibbitts atty

UNITED STATES PATENT OFFICE.

JONAS HINKLEY, OF NORWALK, OHIO, ASSIGNOR TO BOSTWICK & BURGESS, OF SAME PLACE.

CARPET-SWEEPER.

SPECIFICATION forming part of Reissued Letters Patent No. 10,701, dated March 23, 1886.

Original No. 259,856, dated June 20, 1882. Application for reissue filed January 9, 1886. Serial No. 188,106.

*To all whom it may concern:*

Be it known that I, JONAS HINKLEY, of Norwalk, in the county of Huron and State of Ohio, have invented certain new and useful Improvements in Carpet-Sweepers, of which the following is a specification, reference being had to the accompanying drawings, in which—

Figure 1:
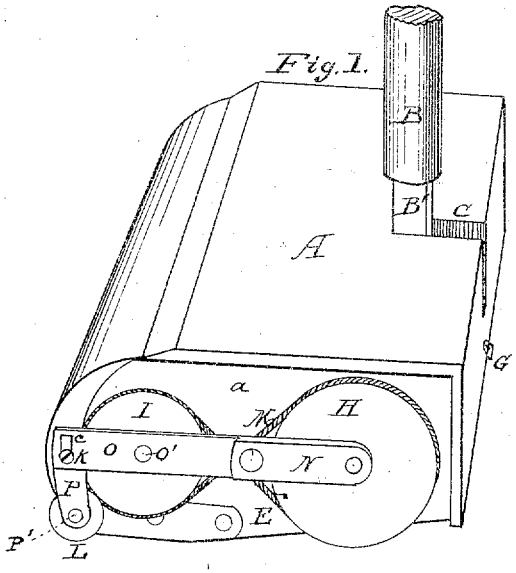
Figure 3:
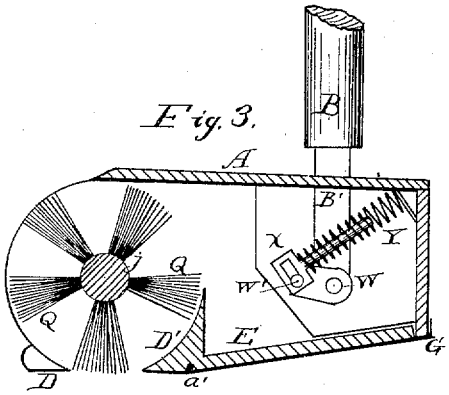
Figure 4:
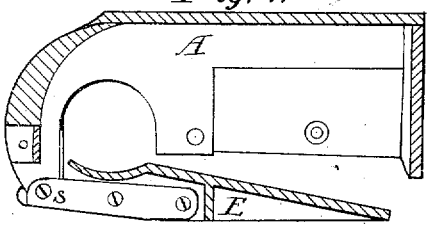
Figure 2:
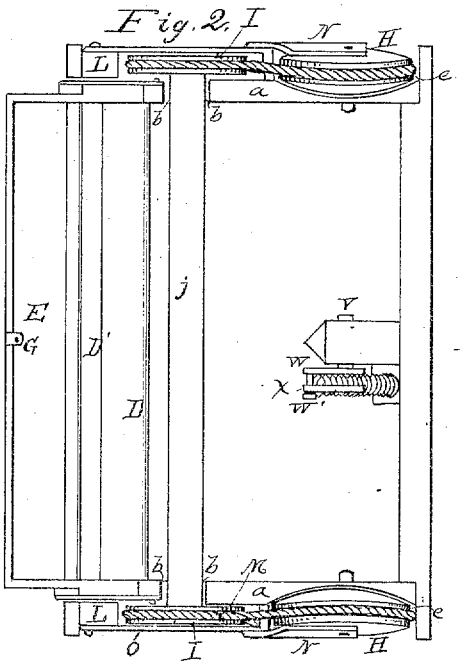
Figure 5:
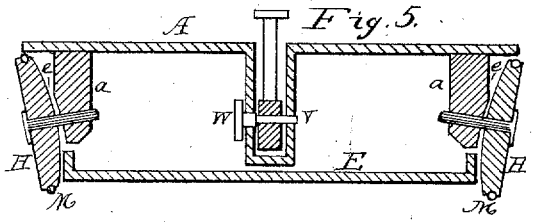
Figure 6:
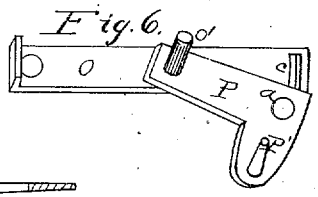
Figure 7:
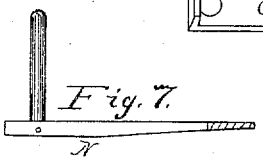

Figure 1 is a perspective view of my improved carpet-sweeper. Fig. 2 is a bottom view of the same with the bristles of the brush omitted and the hinged bottom thrown open. Fig. 3 is a central transverse section. Fig. 4 is an end elevation with driving mechanism removed and the dust-pan lowered. Fig. 5 is a longitudinal vertical section on the line of the journals of the driving-wheels. Figs. 6 and 7 are detailed views.

My invention relates to certain improvements in carpet-sweepers; and it consists, first, of the mechanism for attaching the propelling-handle, whereby said handle will automatically rise and stand in a vertical position, and when depressed the front of the sweeper-box and brush is raised with but a light pressure upon the carpet, the weight of the box thrown back upon the drive-wheels, thus increasing the power of running the brush more effectually; second, in the inclined arrangement of the driving-pulley in its relation with the brush-pulley, whereby the belt connecting them is prevented from rubbing or chafing where it crosses between them; third, in the arrangement of the adjustable bearings for the brush-cylinder, whereby the brush may be adjusted to bear more or less heavily upon the carpet, as desired.

A in the drawings represents the outer casing or body of the sweeper, the ends of the top and sides of which project over the end pieces, *a*, to form a protection to the working mechanism secured at each end of the machine.

B is a propelling handle or lever provided with an arm, B′, the lower end of which is pivoted in a slotted block fixed in the rear side of covering A, and playing in a slot, C, cut in the top and partly down the rear side of the case A. The pivotal pin V of said handle turns with it, and is provided with a crank, W, having a wrist-pin, W′, which engages with a slot in the head of an arm, *x*, around which a spiral spring, Y, is coiled, one end of said spring bearing against the inner corner of the casing A. By this construction the normal position of the handle is vertical, so that it may be more readily seized by the operator without stooping, and the angle of the handle can be changed as desired, the spring being compressed as the angle is changed, whereby the sweeper can more readily be propelled forward or backward. The side of the casing A opposite the handle is curved downwardly and terminates in a metallic strip, D, extending longitudinally of the machine, and is secured at its ends to the transverse end pieces of the casing. The metallic strip D in the operation of the machine rests or slides on the carpet, and is horizontal and forms part of the bottom of the casing A.

*j* represents the shaft of the rotary brush-cylinder, adapted to be raised and lowered in recesses *b b* in the end pieces, *a*. (See Fig. 2.) The outer ends of the shaft *j* are provided with grooved pulleys I I, made in the same piece with the shaft *j*, so made to avoid the introduction of sweepings between the shaft and pulleys. Said pulleys I I are in a vertical line with the ends of the casing. The shaft *j* and its pulleys have their journals in bars O at O′. Said bars O are pivoted on pins on the bars N, which pins are secured in the ends *a* of casing. The movable ends of said bars O have slots *c*, through each of which a set-screw, *k*, passes for adjustably securing that end of the bar to the casing. By means of these adjustable bars the brush is set to bear more or less upon the carpet.

P represents angular arms, pivoted at their inner ends to the bars O by the journal-pins O′, and are provided at their lower ends with right-angle pins P′, carrying rollers L.

H H are grooved pulleys hung obliquely on the ends of the casing, in which they are journaled by forming beveled recesses *e* in the outer faces of the transverse ends of the casing and twisting the arms N, as shown in Fig. 7, said arms having a journal-pin passing through the wheels H H and through the plate *a* in a diagonal line to give the required inclination to said wheels H H. The pulleys H H project below the bottom of the casing, so as to run on the carpet and impart a rapid rotary movement to the brush-cylinder.

M is a cross-belt, connecting the driving-pulley with the brush-pulley.

The object of having the plane of the driving-pulley inclined to the plane of the brush-pulley is to prevent the rubbing or chafing of the belt against itself where it crosses in its operation.

E represents the bottom of the sweeper. It is hinged at S S to the lower front corners of the casing, and is provided with a longitudinal slot extending from end to end, through which the brush extends to reach the carpet. A longitudinal groove, *a'*, (see Fig. 3,) is made in the outer face of the bottom E a short distance from and parallel to the inner edge of the brush-slot, in which groove the edge of a metallic plate, D', is inserted, and thence curved around into the slot and partly around the brush, so as to direct the dust and sweepings into the dust-bin in the casing behind the brush.

G is a catch for fastening the bottom when closed.

Having described my invention, I claim—

1. In a carpet-sweeper, the combination, with the casing A, provided with the slot C, of the arm B', handle B, pin V, crank W W', slotted headed arm *d*, and spiral spring Y, substantially as described, whereby the depressing of said handle increases the traction of the driving-wheels and decreases the pressure of the brush upon the carpet, as specified.

2. In a carpet-sweeper, the combination, with crossed endless belt M, of the grooved wheels I H, having their planes inclined to each other, substantially as described.

3. In a rotary-brush carpet-sweeper, the combination, with the casing A and brush-cylinder Q *j*, of the brush-supporting bars O, pivotally attached to the casing and having slots *c* in their outer ends, adjustably secured by a set-screw, *k*, and provided with the angle-arms P, also pivoted thereon and adjustably held by the same set-screw and carrying the roller L L, all constructed as and for the purpose specified.

JONAS HINKLEY.

Witnesses:
A. B. GRIFFIN,
I. W. GOODELL.